United States Patent [19]

Hasegawa et al.

[11] 3,726,197
[45] Apr. 10, 1973

[54] APPARATUS FOR AUTOMATIC ELECTRONIC FLASH PHOTOGRAPHY

[75] Inventors: Goro Hasegawa; Keizo Yamazaki, both of Tokyo, Japan

[73] Assignee: Canon Kabushiki Kaisha, Tokyo, Japan

[22] Filed: Mar. 26, 1970

[30] Foreign Application Priority Data

| Mar. 26, 1969 | Japan | 44/26230 |
| | Japan | 45/20705 |
| Mar. 2, 1970 | Japan | 45/20704 |
| Jan. 28, 1970 | Japan | 45/7437 |
| Jan. 29, 1970 | Japan | 45/9251 |

[52] U.S. Cl. ............... 95/10 CE, 95/11.5, 95/42, 95/53 EB, 250/215, 315/156
[51] Int. Cl. ................... G03b 7/08, G03b 15/05
[58] Field of Search ............ 95/10 C, 11 R, 11.5, 95/53, 10 CE, 10 CT, 53 EA, 53 EB, 42; 250/206, 215; 315/149, 156

[56] References Cited

UNITED STATES PATENTS

| 3,568,582 | 3/1971 | Uchida | 95/10 CT |
| 3,442,190 | 5/1969 | Erickson | 95/10 CT |
| 3,456,101 | 7/1969 | Rentschler et al. | 95/11 X |
| 3,353,462 | 11/1967 | Suzuki, Nobuo | 95/10 C |
| 3,401,614 | 9/1968 | Gunther | 95/10 C X |
| 3,438,313 | 4/1969 | Topaz | 95/10 C |
| 3,438,766 | 4/1969 | Biber | 95/11 |
| 3,440,938 | 4/1969 | Stimson et al. | 95/10 C |
| 3,517,196 | 6/1970 | Owens | 95/53 X |

*Primary Examiner*—Joseph F. Peters, Jr.
*Attorney*—McGlew and Toren

[57] ABSTRACT

In the apparatus disclosed a photocell is mounted inside the camera and directed toward the film of the camera. After the shutter of the camera is snapped a flash is set off. A control system responds to the output of the photocell to control the amount of light produced by the flash.

1 Claim, 12 Drawing Figures

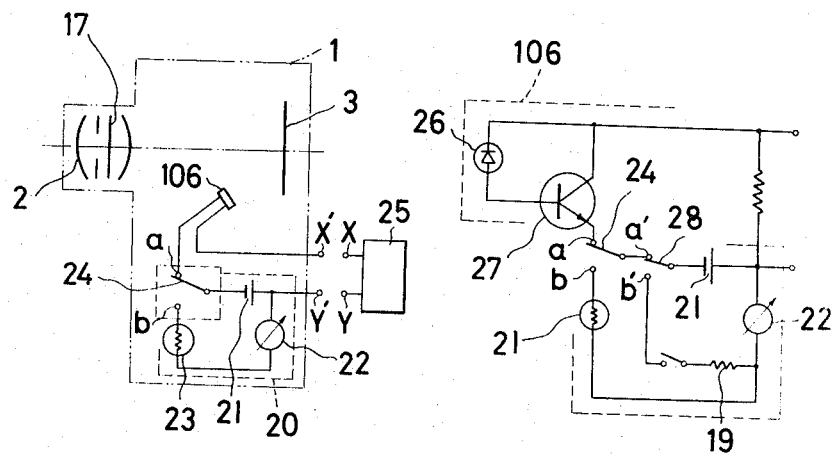
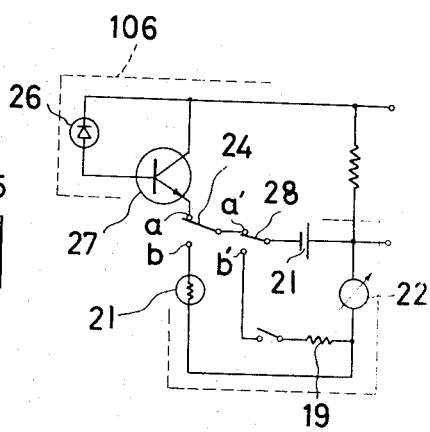
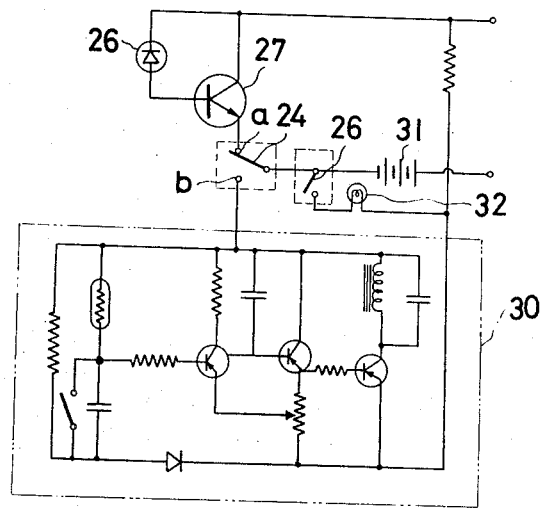

APPARATUS FOR AUTOMATIC ELECTRONIC FLASH PHOTOGRAPHY

In a conventional automatic photographic apparatus using an electric flashing device, a correct exposure is obtained by varying an exposure adjusting member such as the diaphragm of the objective lens on the basis of a constant guide number of a flash device. A recent photographic apparatus uses an electronic flash device, that controls the amount of the light to which a film is exposed by detecting the amount of light reflected from an object with a light detecting member. When an appropriate amount of the light is sensed, an electric signal is generated for cutting off the emission of an electronic discharge tube. However, even in the latter device, a preparatory manual operation is necessary to preset exposure conditions such as the diaphragm opening used, etc. Same the light detecting member is assembled into a flash device which is provided separately from the camera, a precise measurement of the light-amount received by the film can not be obtained.

The object of the present invention is to eliminate such manual operations as mentioned above and to simplify the arrangement in such a manner that said element receives light reflected from the photographing film surface.

However, if the light sensing member is built-in within a camera, the amount of light coming into the light receiving part will be rather small, therefore the output of sensing member will be small, on account of absorption in the objective lens and vignetting by the diaphragm of light reflected from the film, etc. On the other hand, a connector and lead wires are used generally for connecting a flash device outside of a camera. The resistance due to the contact of connector and the resistance of lead wires, etc. are apt to create errors, thus making it difficult to precisely transmit the signal from the detection or sensing member to the flash device.

A further object of the present invention is to install an amplifier in the light sensing member which is built in a camera.

Generally speaking the intensity of the light reflected from the surface of a film is affected by a reflection factor of the film. The reflection factor depends on the kind of film. Therefore even if the light reflecting from an object is the same, a different amount of light enters into the light receiving element. Thus the amount of light emitted by the flashing device becomes different unless an appropriate compensation is provided. Therefore, a still further object of the present invention is to provide such compensating means responsive to the reflection factor of film.

As a means for achieving this object, the reflection factor of the film is measured from the difference between the amount of light reflecting from the leader part of film which is detected before photographing an object light. The electronic flashing device can be adjusted either manually or automatically depending on the reflection factor of the film. The reference light is represented by the amount of light passing through the objective lens or the amount of light reflected from the shutter screen etc.

The present invention will be described in reference to the attached drawings in which:

FIG. 3 is a drawing showing an example of the present inventive apparatus combined with an electric exposure meter.

FIG. 4 is an electric circuit diagram of the main part of FIG. 3 with some modification.

FIG. 5 is a drawing of the present inventive apparatus combined with an electric shutter-controlling device.

FIG. 12 is an enlarged view of FIG. 11.

Figure 1:
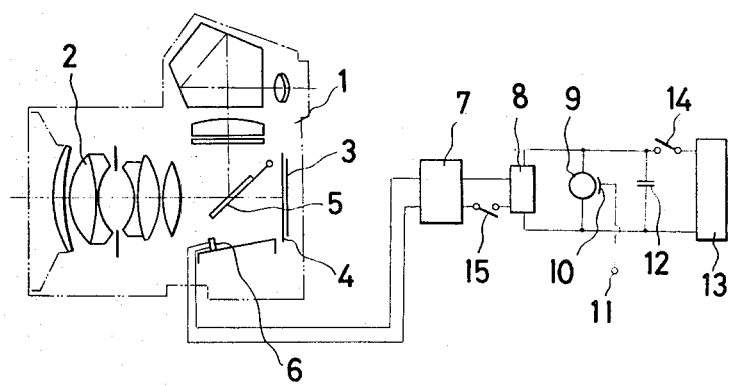
FIG. 1 is a schematic drawing utilizing side elevation and showing an apparatus embodying features of the present invention applied in a single lens reflex camera provided with a partly schematic focal plane shutter.

In FIG. 1, the main body 1 of a camera supports an objective lens 2, a film 3, a shutter screen 4, a swinging mirror 5, and a photo-sensitive element 6 provided within the camera. The light reflecting from the surface of the film 3 is received by the photo-sensitive element 6. An amplifier 7 with an integrating circuit is connected to the photo-sensitive element 6. A control device 8 for regulating the amount of light emitted from a flash discharge tube 9, has a manual adjusting device for the sensitivity of the film. The control device 8 also includes a switching circuit which is triggered by an output of the integrating circuit. The electronic flashing discharge tube includes a triggering element 10 for the tube 9, which has a terminal 11 to be connected to a synchronous terminal of a camera. A capacitor 12 receives energy from a power source 13. A main switch 14 operates the flashing device and an auxiliary switching member 15 is linked with a shutter mechanism and closes circuits of the apparatus just before the shutter functions.

The apparatus of FIG. 1 operates as follows: After the capacitor 12 is charged by closing the main switch 14, the shutter button is released. The mirror 5 then flips up and the shutter 4 is opened. Then a synchronous switch for producing a flash is closed and the signal therefrom is sent through the terminal 11 to the triggering element 10. Thereafter the discharge tube 9 starts to emit light. On the other hand, as the auxiliary switching member 15 is closed just before the shutter 4 is actuated to open, the light reflected from the object reaches the surface of the film 3 through the objective lens 2 which is set beforehand at desired diaphragm opening. The light reflected from the surface of the film enters the photo-sensitive element 6 and the output from the element 6 is amplified by the integrating circuit of the amplifier 7. This actuates the control device 8. The actuation of the control device 8 permits charges from the capacitor 12 to by-pass the tube 10. The intensity of the light received by the photosensitive element 6 affects the timing of the actuation of the control device 8 and the appropriate amount of light emitted by the discharge tube 9 is obtained. Thus the optimum exposure for that specific case is obtained.

Figure 2:
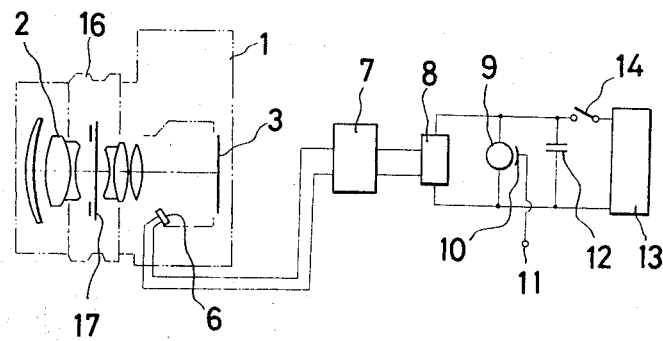
FIG. 2 is a side elevation of the apparatus shown in FIG. 1 as applied in a camera having a lens shutter.

In FIG. 2, a lens shutter unit 16 includes a shutter balde 17. Members 1, 2, 3 and 6 correspond to similar parts as shown in FIG. 1. In this embodiment after the shutter is released, the discharge tube 9 starts to emit light. The diffused light reflected by the object reaches the film 3 through the objective lens 2, and the light reflected by the film enters into the photo-sensitive element 6. The amount of light emitted by the discharge tube 9 is controlled according to the amount of light received by the element 6 as in the former embodiment of FIG. 1. In this case light enters the photo-sensitive element 6 only when the shutter is open, therefore, the auxiliary switching member 15 as shown in FIG. 1 is not necessary.

As explained above, the present inventive apparatus is characterized in that the light reflecting from an object is received by a photo-sensitive element that the amount of light emitted by the electronic discharge flash device is controlled to achieve optimum exposure for a respective exposure condition such as lens aperture by the output of said element determined by the amount of light received by the photo-sensitive element, and that the photo-sensitive element for controlling the flash device is arranged within a camera so as to receive the light reflected by film. The present inventive apparatus detects the amount of light reflected from the picture surface under various photographing conditions such as the F number used and the density of any filter used. The light measured corresponds to the light passing through the objective lens and reflected by the film. There fore the present inventive apparatus has the advantage that it is not necessary manually or even automatically to compensate the photographic conditions for the flashing device. Thus the present inventive apparatus is of simple structure and of easy operation.

In FIG. 3, 106 is a light-amount detecting member, 20 is an electric exposure measuring circuit composed of a photo-sensitive element 23, an ammeter 22 and a power source 21, and change-over means of switch 24. A flash device 25 operates under control of the amount of light when connected to a camera. The light-amount detecting member 106 may be composed of a photo-sensitive element 26 and for example a transistor amplifier 27 which amplifies the out-put of the photosensitive element 26 as shown in FIG. 4. The photosensitive element 26 is, for example, in the form of a silicon type photo-diode. The flashing device 25 under control of the amount of light is composed of, a power source 13, capacitor 12, an electronic discharge tube 9, a triggering element 10, a control device 8, and an amplifier 7 with an integrating circuit, and the device 25 has a terminal 11 to be connected to a synchronous terminal of a camera for flashing as shown in FIG. 1 or 2.

For flash photography, the means 24 is put in contact with a terminal $a$ and the power source 21 of the exposure meter 20 is switched into the light-amount detecting member 106. Then the output of the photo-sensitive element 26 varies in response to the amount of light received, and the thus varied amount is applied to the flash device 25 after being amplified by the transister 27 as shown in FIGS. 3 and 4. In the flash device 25 the output signal from the detecting member 106 is accumulated in the amplifying circuit 7, and when the accumulated amount reaches an optimum exposure value, the flush current is by-passed through the control device 8 with timing responsive to the output of the circuit 7. This cuts off the emission of the discharge tube 9.

In an ordinary photography without flash, the change-over means 24 is switched to a terminal $b$ and then the automatic exposure is obtained with the aid of the photosensitive element 23 and the meter 22. When a switching means 28 is connected to a contact $b$ and the voltage of the power source 21 is checked with a checker circuit including a resistor 19. The voltage of the source 21 is checked with the meter 22.

FIG. 5 shows an embodiment wherein the power source 31 of an electronic shutter controlling device 30 is used as the power source of the light-amount detecting part 106, and the detecting part functions similarly as in the example shown in FIG. 3. When no meter is used in the electric shutter as shown in FIG. 5, an indicating lamp 32 may be provided in the checker circuit and the voltage is easily checked by this lamp.

In the examples shown in FIGS. 3, 4 and 5, an amplifier is included as part of the light-amount detecting part built in the camera, and the power source of the built-in exposure meter or of the electric shutter is also connectable to the light-amount detecting member for use with flash photographing. Therefore even a small output from the light-amount detecting member can be transmitted to the flash device without error. Thus the apparatus can be made small at low cost. Because the power source of the electric exposure meter, or of the electric shutter is for small currents and for a fixed voltage, the amplifier installation is suited for the power source and is quite advantageous from the standpoint of accuracy. In addition, compared to the case when a separate power source is provided solely for the light-amount detecting device or member, the checker circuit is also simplified.

Figure 6:
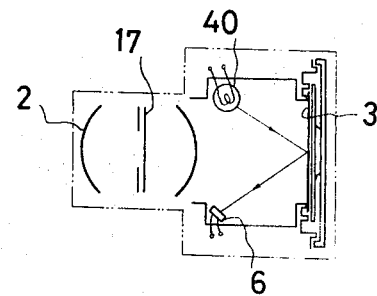
FIG. 6 and FIG. 7 are drawings showing an outline of an apparatus with a lens shutter to which is applied a device to compensate the reflection factor of a film.
Figure 7:
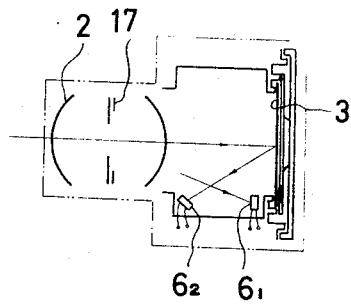
Figure 8:
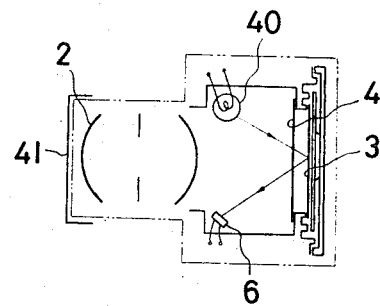
FIG. 8 is a drawing showing an outline of an apparatus with a focal plane shutter camera to which is applied a device to compensate the reflection factor of a film.

FIG. 6 through FIG. 8 show examples wherein the reflection factor of the film loaded into a camera is measured beforehand and the camera operation is compensated for differences in the reflection factor. FIG. 6 shows an example applied to a lens shutter camera in which the shutter blade 17 is not opened or closed during a preparatory idle feeding of film, that is, feeding of the leader part of film. In this example the lamp 40 of fixed intensity of light provided within a camera is illuminated when the leader part is fed, and the amount of light reflected from the film is detected by the photosensitive element 6. The reflection factor of the film 3 is calculated from the difference between the amount of light thus detected and the reference amount of light predetermined. The exposure device is compensated according to the reflection factor of the film as disclosed in reference to the control device 8 in FIG. 1.

FIG. 7 shows an example wherein the present invention is applied to a lens shutter camera whose shutter blade 17 is actuated to open during a preparatory idle feeding of film. In the example two photo-sensitive elements $6_1$, $6_2$ are provided with the camera, and one of the elements $6_1$ directly measures the amount of light passing through an objective lens 2 during the feeding the leader part of the film, while the other element $6_2$ measures the amount of light reflected from the film. The reflection factor of the film is detected from the difference between the amounts of light thus received by the elements $6_1$ and $6_2$.

FIG. 8 shows an example in which the present invention is applied to a focal plane shutter camera, wherein a cap 41 is put onto the objective lens 2, with the shutter 4 present at a moderate shutter time for assuring the shutter full open, and thus the reflection factor is measured, in a similar way as in FIG. 6, with the aid of the lamp 40 with a fixed intensity of light. Such arrangement can also be used with the cap 41 is removed. In this case the light passing through the objective lens 2 is directed onto the shutter screen 4 and the reflection factor is measured from the difference between the amount of light reflected from the surface of shutter screen and the amount of light reflected from the film. Thus the exposure device is ready to be compensated according to the measured reflection factor.

The embodiments shown in FIG. 6, 7 and 8 have the following effects:

manual operation is simplified as the measurement of reflection factor of film can be achieved during a preparatory idle feeding of film or film leader part before photographing a scene.

As the reflection factor of the film used for photographing is preparatorily measured, the difference in reflection factor depending on kinds of film as well as variation in reflection factor among same kind of film can be indicated. Thus compensation with very high level of accuracy is easily achieved.

In the present inventive apparatus because the compensating means is provided within a camera compared to conventional apparatus having compensating means in the flashing device outside of a camera, each element such as a photo-sensitive element, power source, etc. may also be used as an element in the electric shutter device or in the electronic flashing device for controlling the amount of light, thus the entire apparatus can be made with low cost.

In the above examples shown in FIGS. 6, 7 and 8 the reflection factor of film actually loaded into a camera is measured for compensation. However, the structure and operation are rather complicated in these cases. For simplification of the structure and operation, modifications shown in FIG. 9 and FIG. 10 may be made.

Generally speaking, a great difference in reflection factor of the photo-sensitive surface of the film lies between a mono-chromatic film and a chromatic film, while the difference in reflection factor is comparatively small among monochromatic films or chromatic films themselves, that is among black and white films and among colored films.

Figure 9:
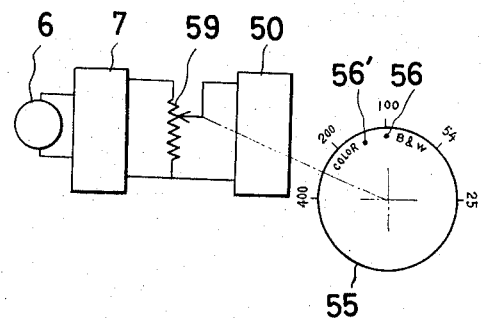
FIG. 9 and FIG. 10 are schematic drawings of an apparatus for compensating the reflection factor of a film with a setting member.
Figure 10:
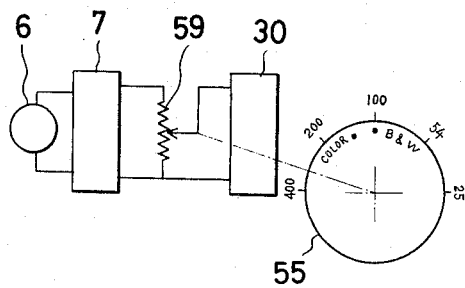

The modifications shown in FIG. 9 and FIG. 10 are to provide a simplified structure chiefly for furnishing compensation for the difference in reflection factor between two different kinds of films, that is between a mono-chromatic film and a chromatic film.

FIG. 9 shows an example in which the present invention is applied to an electronic flashing device with a means for controlling light-amount emitted. Here member 6 is a photo-sensitive element, 7 is an amplifying circuit for the element 6, 59 is a resistor for adjusting the output of amplifying circuit 7, 50 is an electronic flashing device under controll of the output of the integrating circuit therein. A film sensitivity adjusting dial 55 linked with the resistor 59, has two marks 56, 56' for a black & white film and a colored film respectively. A scale 54 for film sensitivity is arranged on the unmovable part at the circumference of the dial 55. As the sensitivity dial 55 is rotated to align one of the marks 56 or 56' to a index on the scale 54 in response to the film to be used, the resistance value of the resistor 59 is adjusted for a correct exposure. The positions of the marks 56 and 56' spacedly provided corresponds to the difference in reflection factor between a black & white film and a colored film. The difference in reflection factor is also compensated for when the sensitivity of film is adjusted. The output of the photo-sensitive element 6 is amplified by the amplifying circuit 7 and through a bleeder of the resistor 59, enters into the electronic flashing device 50 to control the amount of light emitted. After adjusting the kind of film and the sensitivity of the same with the dial 55, the camera is directed toward an object and the shutter is released and at the same time the flashing device 50 is caused to emit light. Then the light reflecting from the object is further reflected from the film and enters into the photo-sensitive element 6. As the amount of light passing through the lens reaches a predetermined value corresponding to the sensitivity and kind of film, the control circuit in the device 50 is actuated to stop emission of light.

FIG. 10 shows an example in which the present invention is applied to a camera having an electronic shutter, wherein a film sensitivity adjusting dial 55 has the same arrangement as in FIG. 9 and is linked to a resistor 59 and compensation for the difference in reflection factor is effected as well as the compensation of film sensitivity in an electronic shutter 30 with a controlling circuit.

In the present inventive apparatus, since the light receiving part acts to prevent the light from directing toward the film, the light receiving part is arranged obliquely against the surface of film or the shutter screen. As a result, measurement of light is done mainly at a portion of picture surface most close to the light receiving part.

Generally speaking, in ordinary cases, strong light such as from the sky or an electric lamp, etc. is situated at an upper part of the main object, that is at a lower part of an image in a camera, while the main object is located at the center of the lower part, therefore unless said latter part is particularly measured a proper exposure value can not be obtained.

Also as light is diffused at the surface of film and reflected in various directions, even if the photo-sensitive element is positioned being directed otherwise, the light reflected from bright portion at the upper part of the film enters into the element, thus resulting in erroneous measurement of the amount of light.

In order to prevent such a disadvantage, a condensor lens and light shielding means such as a cylindrical support of the condensor lens are provided in front of the photo-sensitive element and the optical axis of the condensor lens is directed to the portion of the picture surface most appropriate for light measuring purpose. Thus precise exposure may be secured.

Figure 11:
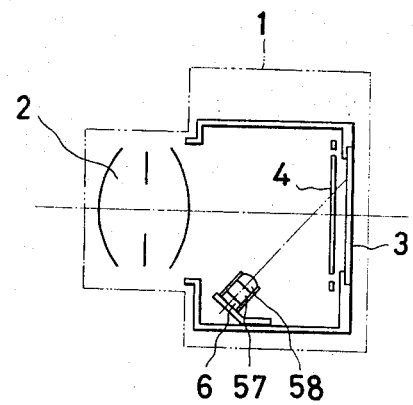
FIG. 11 and FIG. 12 are views in part of a photo-sensitive device of an apparatus of the present invention.
Figure 12:
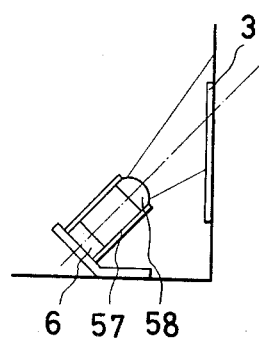

Explanation shall be made on the basis of the examples in FIG. 11 and FIG. 12, wherein 1 is a camera, 2 is an objective lens, 4 is a shutter screen, 3 is film. A cylindrical support 57 is provided for the photo-sensitive element 6 and the support 57 is fixed outside of the optical path of the objective lens 2. At the tip of the support 57, a condensor lens 58 is provided. The optical axis of the lens 58 is directed to the portion of the picture surface a little above the center of the picture surface.

The light passing through the objective lens 2 is reflected from the film 3 or the shutter screen 4 and enters the photo-sensitive element through the condensor lens 58. Because the optical axis of the condensor lens 58 is directed to a fixed portion of the picture surface as explained above, and the angle of light incidence to the element 6 is limited by the condensor lens and the cylindrical support 57, only the light reflected from the optimum portion within the picture surface can be measured. Thus, for example, in photographing such a scene in which electric lamp comes into the picture plane, a proper exposure can be made precisely with such light measurement without being effected by the light reflected from the lamp.

Since the present embodiment as explained above, the optical axis of condensor lens toward the optimum portion of the picture surface, a sensitivity distribution most suitable to photographing is achieved. Since undesirous stray light within a camera, for example, the light from a finder in a single lens reflex camera or in internal reflective light is prevented from entering into the photo-sensitive element, exact measurement of light is achieved. The embodiment is very effective in a camera using an electronic flash device for controlling the amount of light emitted or in a camera using an electronic shutter.

What is claimed is:

1. An apparatus for flash photography, comprising a camera having a focal plane, light responsive means mounted within the camera and directed at the focal plane for responding to the light reflected from the focal plane, electrically responsive flash means for illuminating objects to be photographed by the camera in response to the electrical signals applied thereto, control means responsive to said light responsive means and coupled to said flash means for electrically regulating the electrical energy applied to said flash means and in response to said light responsive means, and film mounted on the focal plane of said camera, said light responsive means sensing the light reflected from the film, said film having a leader, said control means including detecting means for detecting a reflection factor of the leader, said control means including compensating means for compensating said control means in response to said detecting means.

2. An apparatus for flash photography, comprising a camera having a focal plane, light responsive means mounted within the camera and directed at the focal plane for responding to the light reflected from the focal plane, electrically responsive flash means for illuminating objects to be photographed by the camera in response to electrical signals applied thereto, control means responsive to said light responsive means and coupled to said flash means for electrically regulating the electrical energy applied to said flash means and in response to said light responsive means, and reflection factor compensating means in said control means.

3. An apparatus as in claim 2, wherein said control means includes detecting means connected to said reflection factor compensating means for detecting a reflection factor at the focal plane and for applying signals to said reflection factor compensating means.

4. An apparatus as in claim 2, further comprising means for holding film at the focal plane of the camera, said control means including detecting means for detecting the reflection factor of film when film is held at the focal plane in the camera by said means for holding the film, said compensating means being coupled to said detecting means for responding thereto.

5. An apparatus as in claim 2, wherein said control means include integrating means for measuring the total value of light sensed by said light responsive means.

6. An apparatus as in claim 2, wherein said control means includes energy storage means for energizing said flash means, and said control means including energy absorption means for drawing energy from said energy storage means when the total light sensed by said light responsive means exceeds a predetermined threshold value.

7. An apparatus for flash photography, comprising a camera having a focal plane, light responsive means mounted within the camera and directed at the focal plane for responding to the light reflected from the focal plane, electrically responsive flash means for illuminating objects to be photographed by the camera in response to electrical signals applied thereto, control means responsive to said light responsive means and coupled to said flash means for electrically regulating the electrical energy applied to said flash means and in response to said light responsive means, and film mounted in the focal plane of said camera, said light responsive means sensing the light reflected from the film, said light responsive means comprising means for shielding a direct light through an objective lens of the camera and for selectively receiving a portion of the light reflected from the film, said light responsive means being positioned at a position outside of the light path of the objective lens.

8. An automatic exposure control system for a camera having a focal plane at which a photosensitive surface is to be placed, comprising an optical objective for projecting an image from an external object toward the focal plane, light control means in line with said objective for normally blocking illumination of said focal plane, photosensitive means disposed to receive light rays from the direction of the focal plane when the light control means is in an unblocked position, an electronic flash device having a synchronous switch for starting light emission from said electronic flash device, said synchronous switch being coupled with said light control means for operation therewith, trigger means coupled to said light control means to change said light control means to its unblocking condition and thereby allow a radiant flux to be directed by the objective towards the focal plane, regulator means operatively connected to said electronic flash device for ending light emission from said flash device, and circuit means responsive to the output of said photosensitive means and to said regulator means for constraining said regulator means to end the light emission substantially instantaneously in response to a progressively increasing accumulated electric output of said photosensitive means due to radiant flux from the focal plane; one of said photosensitive means, said regulator means, and said circuit means including detecting means for detecting a reflection factor at the focal plane.

9. An automatic exposure control system, as in claim 8, wherein said detecting means includes reflection factor compensating means.

10. An automatic exposure control system for a camera having a focal plane on which a photosensitive surface is to be placed, comprising an optical objective for projecting light from an external object toward the focal plane so as to strike the photosensitive surface, light control means in line with said objective for normally blocking illumination of the photosensitive surface, photosensitive means disposed to receive light reflected from the direction of the focal plane, an amplifier responsive to the output of said photosensitive means, an electronic timing device responsive to the output of said amplifier, trigger means operable to move said light control means into an unblocking position so that a radiant flux can be directed by the objective toward the photosensitive surface at the focal plane, a control device operatively connected to said electronic timing device for bringing said light control means back to its normal blocking position, said amplifier and said electronic timing device forming a circuit for actuating said control device and said light control means in response to radiant flux on said photosensitive means so as to constrain said light control means to be moved back into its blocking position; one of said circuit and said electronic timing device including detecting means for detecting a reflection factor of the leader part of the photosensitive surface so as to compensate the apparatus.

11. An automatic exposure control system for a camera having a focal plane on which a photosensitive surface is to be placed, comprising an optical objective for projecting light from an external object toward the focal plane so as to strike the photosensitive surface, light control means in line with said objective for normally blocking illumination of the photosensitive surface, photosensitive means disposed to receive light reflected from the direction of the focal plane, an electronic timing device responsive to the output of said photosensitive means, trigger means operable to move said light control means into an unblocking position so that a radiant flux can be directed by the objective toward the photosensitive surface at the focal plane, a control device operatively connected to said electronic timing device for bringing said light control means back to its normal blocking position, said electronic timing device forming a circuit for actuating said control device and said light control means in response to radiant flux on said photosensitive means so as to constrain said light control means to be moved back into its blocking position; one of said circuit and said electronic timing device including detecting means for detecting a reflection factor of the leader part of the photosensitive surface so as to compensate for reflection factor in the apparatus.

12. An automatic exposure control system, as in claim 11, wherein said detecting means includes a reflection factor compensating means.

13. An automatic exposure control system, as in claim 11, wherein said photosensitive means includes a photo-sensitive element and a condenser lens between the photosensitive element and the focal plane.

14. An automatic exposure control system for a camera having a focal plane on which a photosensitive surface is to be placed, comprising an optical objective for projecting light from an external object toward the focal plane as as to strike the photosensitive surface, light control means in line with said objective for normally blocking illumination of the photosensitive surface, photosensitive means disposed to receive light reflected from the direction of the focal plane, an amplifier responsive to the output of said photosensitive means, an electronic timing device responsive to the output of said amplifier, trigger means operable to move said light control means into an unblocking position so that a radiant flux can be directed by the objective toward the photosensitive surface at the focal plane, a control device operatively connected to said electronic timing device for bringing said light control means back to its normal blocking position, said amplifier and said electronic timing device forming a circuit for actuating said control device and said light control means in response to radiant flux on said photosensitive means so as to constrain said light control means to be moved back into its blocking position, said photosensitive means being located outside the path of light from said objective means to the focal plane, said photosensitive means being directed to receive reflected light from the focal plane over only a portion of the film to be subjected to radiant flux from said objective.--

15. An automatic exposure control system for a camera having a focal plane on which a photosensitive surface is to be placed, comprising an optical objective for projecting light from an external object toward the focal plane so as to strike the photosensitive surface, light control means in line with said objective for normally blocking illumination of the photosensitive surface, photosensitive means disposed to receive light reflected from the direction of the focal plane, an electronic timing device responsive to the output of said photosensitive means, trigger means operable to move said light control means into an unblocking position so that a radiant flux can be directed by the objective toward the photosensitive surface at the focal plane, a control device operatively connected to said electronic timing device for bringing said light control means back to its normal blocking position, said electronic timing device forming a circuit for actuating said control device and said light control means in response to radiant flux on said photosensitive means so as to constrain said light control means to be moved back into its blocking position, said photosensitive means being located outside the path of light from said objective means to the focal plane, said photosensitive means being directed to receive reflected light from the focal plane over only a portion of the film to be subject to radiant flux from said objective.

\* \* \* \* \*